United States Patent [19]

Poubeau

[11] 4,184,572

[45] Jan. 22, 1980

[54] DEVICE FOR TEMPORARILY RIGIDLY UNITING A FREE CIRCULAR ELEMENT WITH A FIXED CIRCULAR ELEMENT

[75] Inventor: Pierre Poubeau, Le Pecq, France

[73] Assignee: Societe Nationale Industrielle Aerospatiale, Paris, France

[21] Appl. No.: 900,551

[22] Filed: Apr. 27, 1978

[30] Foreign Application Priority Data

Apr. 29, 1977 [FR] France .................................. 77 13117

[51] Int. Cl.² .............................................. F16D 51/04
[52] U.S. Cl. ........................................ 188/74; 188/75; 188/77 R; 188/250 B; 188/259; 188/335; 188/343; 192/76; 192/79; 192/93 R
[58] Field of Search ............... 188/216, 70 R, 75, 77, 188/335, 336, 337, 340, 343, 74, 250 A, 250 B, 250 H, 249, 259; 192/76, 78, 79, 93 R

[56] References Cited

U.S. PATENT DOCUMENTS

| | | | |
|---|---|---|---|
| 1,276,792 | 8/1918 | Morse | 188/75 |
| 1,895,996 | 1/1933 | Jones | 188/75 |
| 2,685,944 | 8/1954 | Faucher et al. | 188/74 |
| 3,026,128 | 3/1962 | Willis . | |
| 3,085,660 | 4/1963 | Darling | 188/335 |
| 3,468,403 | 9/1969 | Nasvytis | 192/76 X |
| 3,780,835 | 12/1973 | Harrison | 192/79 X |

*Primary Examiner*—George E. A. Halvosa
*Attorney, Agent, or Firm*—Karl W. Flocks

[57] ABSTRACT

A device for temporarily holding fast a free circular element with respect to a fixed circular element having circular segments with tangential ramps and a rigid ring with rollers axially rotatable thereon for local thrust against the ramps to cause locking of the free circular element with respect to the fixed circular element. Clevises bearing axial grooved rollers riding on the rigid ring, with the clevises connected to the segments by springs, providing an elastic restoring force to release the free circular element with respect to the fixed circular element.

7 Claims, 6 Drawing Figures

DEVICE FOR TEMPORARILY RIGIDLY UNITING A FREE CIRCULAR ELEMENT WITH A FIXED CIRCULAR ELEMENT

The present invention relates to devices for temporarily rigidly uniting a free circular element with a fixed circular element, and more particularly to the application made thereof in the space domain for locking and/or releasing the rotor of a satellite momentum wheel.

Satellite momentum wheels will be making increasing use of magnetic bearings, which avoid all mechanical contact between the stationary or stator and movable or rotor portions.

The environmental conditions of vibration during the launch phase make it imperative for the rotor to be made fast with the stationary portion throughout this phase in order to avoid impacts between these two portions, impacts which could cause damage sufficient to prevent operation of the equipment when the satellite is in orbit.

Upon receiving an appropriate signal, the device which performs this function releases the rotor so that the equipment can be rendered operative, and this operation must be carried out with a very high degree of reliability. Certain prior-art devices have in fact enabled a satellite to be restrained on its launching rocket-stage by means of explosive straps, but such means have not completely resolved the problem for a number of reasons, the most important of which is the inability to lock and/or release the momentum wheel at will during all the phases, to wit on the ground for check-out purposes and during the launch preparation phase.

Thus, after effecting an explosive release responsively to a signal, such explosive-strap devices released the elements once and for all without any possibility of subsequent relocking.

Because these prior-art mechanisms have not given complete satisfaction, the Applicant was led to devising a device capable of overcoming the problem as it arose in his own particular domain, namely space, and by extension in any other field in which a similar problem had to be overcome.

The description which follows of a specific form of embodiment of a mechanism for temporarily rigidly uniting the rotor with the stator of a satellite momentum wheel on magnetic bearings, given with reference to the accompanying non-limitative exemplary drawings, will give a clear understanding of how the invention can be carried into practice.

In the drawings:

FIG. 3 is a cross-section taken through the line III—III of FIG. 1;

FIG. 4 is a cross-section taken through the line IV—IV of FIG. 1;

Figure 1:
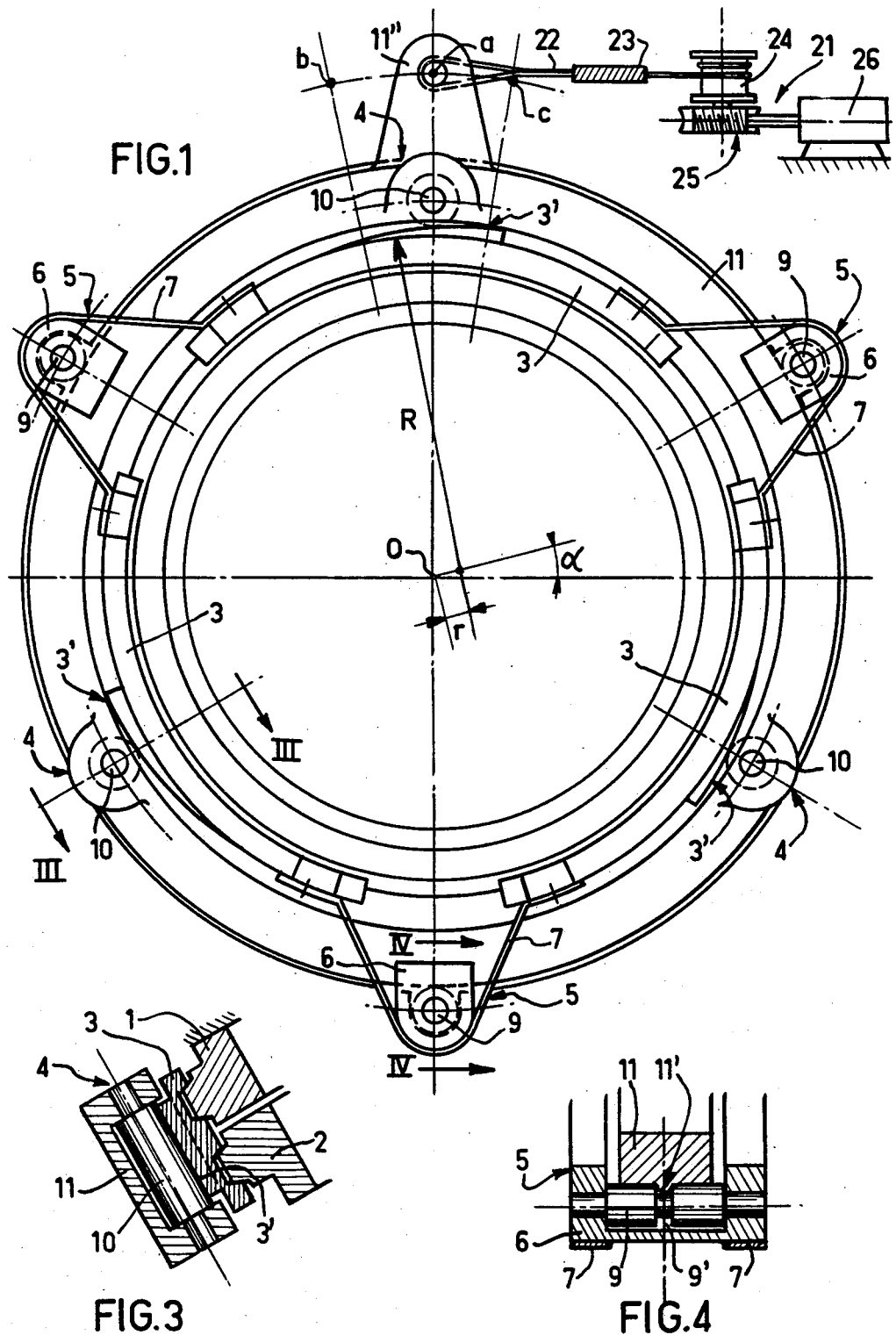
FIG. 1 shows in plan view the subject device of this invention in a first configuration in which the stator and rotor to be rigidly united are internal to said device.

Referring first to FIGS. 1 and 3, which represent a configuration in which the subject device of the invention is located externally, it will be seen that the element 1 is fast with the satellite stator and that the element 2 is fast with the satellite rotor which rotates about the axis 0.

Rigid uniting of these two elements is obtained, on the one hand, by reason of a special sloping-flanks profile of their periphery and, on the other, by the action of an arrangement of equidistant circular segments 3 with tangential ramps 3' engaging into said flanks, the complete systems being generally designated by reference numeral 4.

Each circular-segment system 4 is thus integrated through a ring 11 bearing rollers 10 in mechanical contact with tangential ramps 3' of circular segments 3, whereby any angular displacement of ring 11 in a direction such that the rollers 10 produce a radial displacement of segments 3 towards axis 0 causes said segments to tend to jam against the sloping flanks of the elements 1 and 2 to be rigidly united, the resultant of the forces applied being at 0.

Conversely, with the elements 1 and 2 rigidly united, any angular displacement of ring 11 in a direction such that the rollers permit radial displacement of segments 3 in a direction opposite to axis 0, releases the element 2 from element 1.

The segments 3 are held in position by elastic restoring means generally designated by reference numeral 5 and disposed equidistantly between said segments.

Each elastic means 5 comprises a floating clevis 6 supporting a grooved shaft 9, and the link with segments 3 is provided by flat springs 7 positioned on either side of a thrust ring 11 formed with a ridge 11' and on which said grooved shafts 9 bear. The shaft grooves 9' and the ring ridge 11' thereby ensure correct guidance of the segments whilst allowing them the necessary latitude for their radial motions.

Thus ring 11 does not affect the angular positioning of elastic means 5 during its own angular movements, and it is to be noted that the opposing force produced by the action of rollers 10 on ramps 3' on the one hand and of the springs 7 of elastic means 5 (which urge the segments 3 away from the center 0), on the other, is such that the device as a whole remains in equilibrium even in the released configuration, that is, when lever 11" is in the position b in FIG. 1, which also depicts the fundamental locked state at a, that is, in which elements 1 and 2 are rigidly united.

It will readily be appreciated that movement of lever 11" towards position c will increase the pressure of segments 3 against elements 1 and 2, and this as a function of the parameters R, r and α that determine the profile of the ramp; however, it is to be understood that said ramp may have any other appropriate profile such as a flat, elliptical or other profile, or may even additionally extend over a purely circular portion the center of whose radius R coincides with 0.

Regarding the method of moving lever 11" in order to vary the angular position of ring 11, this can be accomplished in a variety of ways, one of which will be described hereinbelow for exemplary purposes.

Lever 11" comprises an axle about which is wrapped the eye of a cable 22 capable of being broken by a pyrotechnic element 23 activated by a signal which is depicted schematically in FIG. 1.

The end of cable 22 is wound around a drum 24 connected to a reversible DC electric motor 26.

It will readily be seen that when lever 11" is in position b, the elastic means 5 tend to open the segments 3 which then release the element 2 from element 1, enabling the rotor to be set in rotation.

When motor 26 is energized in the sense whereby lever 11" shifts from b towards a, the segments 3 close once more and the rotor is locked.

Since this system is reversible, rotating the motor 26 in the opposite direction will cause lever 11" to return from position a to position b and to thereby release the rotor once more.

It is to be noted that when the satellite is in orbit, the pyrotechnic element 23 makes any further locking impossible even in the event of improper operation of the motor 26.

Figure 2:
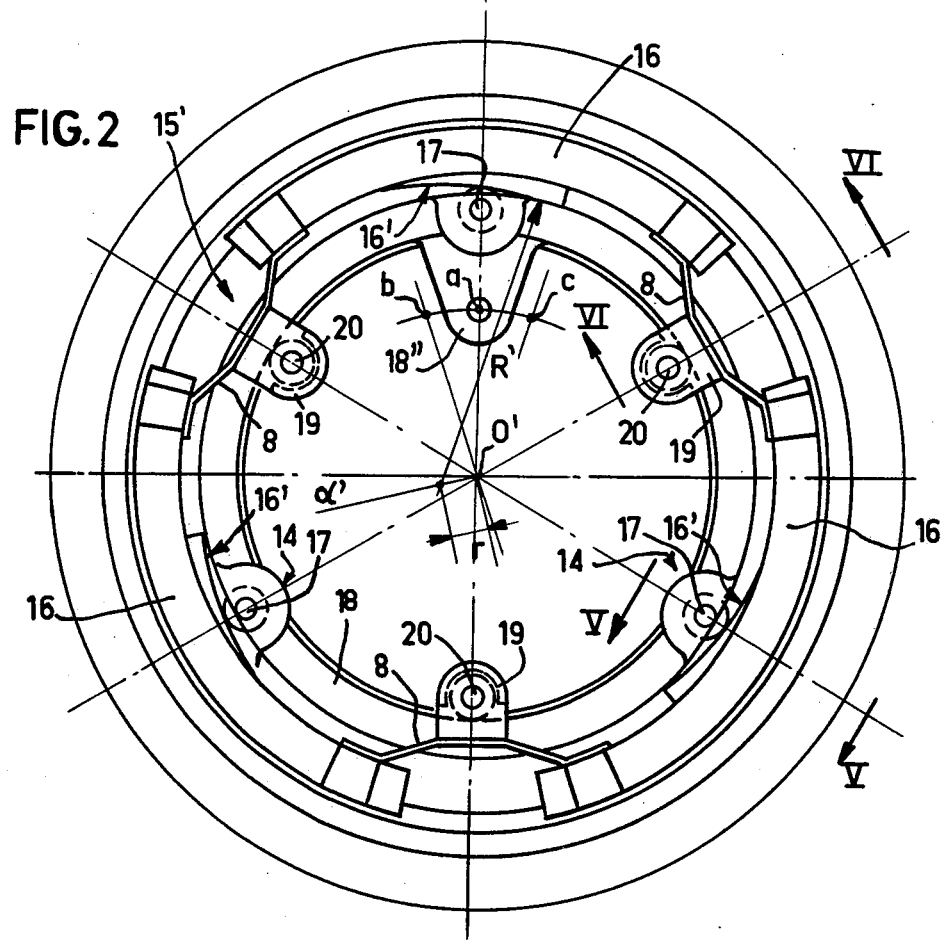
FIG. 2 shows in plan view the subject device of this invention in a second configuration in which the stator and rotor to be rigidly united are external to said device.
Figure 5:
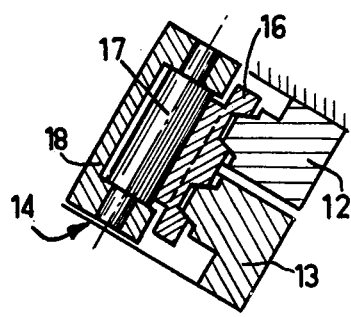
FIG. 5 is a cross-section taken through the line V—V of FIG. 2.
Figure 6:
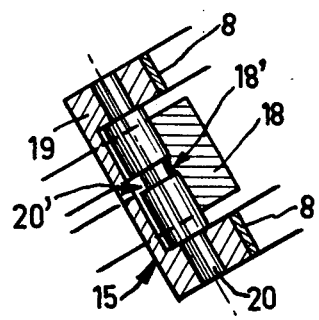
FIG. 6 is a cross-section taken through the line VI—VI of FIG. 2.

In an alternative embodiment of the invention shown in FIGS. 2, 5 and 6, the subject device of this invention is located internally and it will be seen that the element 12 is fast with the satellite stator whereas element 13 is fast with the satellite rotor, which rotor spins about the axis 0'.

The rendering mutually fast of the elements 12 and 13 is accomplished, on the one hand, by a special inclined-flank profile of their peripheries and, on the other, by an arrangement of equidistant circular segments 16 with tangential ramps 16' engaging into said flanks and generally designated by reference numeral 14.

Each arrangement of circular segments 14 is thus integrated through a ring 18 supporting rollers 17 in mechanical contact with the tangential ramps 16' of said circular segments 16, whereby any angular displacement of ring 18 in a direction such that the rollers 17 cause a radial displacement of segments 16 in a direction away from axis 0', causes said segments to bind against the inclined flanks of the elements 12 and 13 to be rigidly united, the direction of the forces applied being towards axis 0'.

Conversely, when the elements 12 and 13 are mutually fast, any angular displacement of ring 18 in a direction such that the rollers 17 produce a radial displacement of segments 16 towards 0' reverses the process and releases element 13 from element 12.

The segments 16 are held in position by elastic restoring means generally designated by reference numeral 15 and disposed equidistantly between said segments.

Each elastic means 15 comprises a floating clevis 19 supporting a grooved shaft 20, and the link with segments 16 is provided by flat springs 8 positioned on either side of a thrust ring 18 formed with a ridge 18' upon which said grooved shafts 20 bear. The shaft grooves 20' and the ring ridge 18' thereby ensure correct guidance of the segments whilst allowing them the necessary latitude for their radial movements.

Thus the ring 18 does not affect the angular position of the elastic means 15 during its own angular motion, and it will be seen that the opposing force produced by the action of rollers 17 on ramps 16', on the one hand, and of the springs 8 of elastic means 15 (which urge the segments 16 towards the center 0'), on the other, is such that the device as a whole remains in equilibrium even in the released configuration, that is to say when lever 18" is in position b in FIG. 2, which figure also depicts the fundamental locked state at a, that is, in which elements 12 and 13 are rigidly united.

It will be manifest in this case too that motion of lever 18' towards position c will increase the pressure of segments 16 against elements 12 and 13, and this as a function of the parameters R', r' and α' which determine the profile of the ramp, which ramp may have any alternative convenient profile such as a flat, elliptical or other profile, or may even additionally be extended over a purely circular portion the center of the radius R' of which then coincides with axis 0'.

The configuration of the device corresponding to FIG. 2 may include a drive mechanism identical to that of FIG. 1, and accordingly this mechanism will not be described further.

Manifestly, the description given hereinbefore is intended to clearly show the possible application of the device according to this invention to the locking and/or releasing of a free element, represented by a satellite rotor and having magnetic bearings, with respect to the associated stationary or stator portion, and that any other application made in the spirit of this invention would fall within the scope thereof.

Indeed it is to be understood that the present invention has been described and illustrated solely in regard to a preferred exemplary embodiment, and that changes and substitutions may be made without departing from the scope of the invention as set forth in the appended claims.

For instance, the elements and segments may be in any number whatsoever, and recourse can be had to any convenient means by way of elastic means or means for acting on the ramps, always provided that the desired result is achieved.

Similarly, any convenient means may be used to produce the angular displacement of the ring, the configuration of which could be either internal or external to the elements to be rigidly united.

I claim:

1. A device for temporarily holding fast the rotor of a satellite momentum wheel with respect to the stator of the momentum wheel comprising
    spaced axially aligned circular elements respectively secured to said rotor and said stator, said elements having wedging surface means,
    equidistant circular segments having surface means to engage said wedging surface means of said circular elements and tangential ramps adapted to cause each of said segments to come to rest in wedged relationship simultaneously with both of said circular elements for holding them fast and in spaced relationship both radially and axially with respect to each other,
    a rigid ring having bearing thrust means for exerting local thrust against said ramps of said segments,
    elastic restoring means for returning said segments to their non-thrusting position,
    angular urging means for exerting angular urge on said rigid ring,
    said segments, said rigid ring, and said elastic means being arranged in respect to each other so that upon said rigid ring being urged angularly by said angular urging means in a direction to cause said local thrust means thrusting against said segment ramps to cause said segments to move radially with respect to said circular elements, to rigidly unite said circular elements by wedging; and upon said rigid ring being urged angularly in the opposite direction, to unwedge said circular elements and said segments to disunite said circular elements.

2. A device as claimed in claim 1, in which the relationship for wedging said free and stationary circular elements is provided by peripheral grooves with inclined flanks.

3. A device as claimed in claim 1, in which said thrust means for exerting local thrust against said tangential ramps are formed by rollers axially rotatable on said rigid ring.

4. A device as claimed in claim 1, in which said elastic restoring means are formed by clevises bearing axial grooved rollers riding on said rigid ring formed with a ridge for engaging with the roller grooves and by springs for connecting the clevises with the segments, said springs restraining said segments and providing the force required to maintain the segments in a released position opposed to the action of the local thrust means on the tangential ramps producing the locking effect.

5. A device as claimed in claim 1, in which said angular urging means for exerting angular urge on said rigid ring are formed by a pyrotechnically breakable cable having one end connected to a lever fast with the ring and the other end wound around a drum with a worm-and-gear mechanism connected to a reversible motor in such manner that rotation of the motor in one direction urges the ring angularly into a wedging or locking motion, and rotation of the motor in the opposite direction urges the ring through an angular motion to cause unwedging or release.

6. A device as claimed in claim 1, in which said rigid ring, said equidistant segments and said elastic restoring means are disposed outside said circular elements.

7. A device as claimed in claim 1, in which said rigid ring, said equidistant segments and said elastic restoring means are disposed inside said circular elements.

* * * * *